United States Patent [19]

Tomisawa et al.

[11] Patent Number: 5,427,069
[45] Date of Patent: Jun. 27, 1995

[54] APPARATUS AND METHOD FOR FUEL INJECTION TIMING CONTROL OF AN INTERNAL COMBUSTION ENGINE

[75] Inventors: Naoki Tomisawa; Shigemi Sugino; Toru Kitayama, all of Atsugi, Japan

[73] Assignee: Unisia Jecs Corporation, Atsugi, Japan

[21] Appl. No.: 193,133

[22] PCT Filed: Jun. 18, 1993

[86] PCT No.: PCT/JP93/00829

§ 371 Date: Mar. 18, 1994

§ 102(e) Date: Feb. 18, 1994

[30] Foreign Application Priority Data

Jun. 18, 1992 [JP] Japan .................................. 4-159851

[51] Int. Cl.⁶ .............................................. F02M 5/00
[52] U.S. Cl. ................................................... 123/478
[58] Field of Search ................ 123/478, 418, 480, 486

[56] References Cited

U.S. PATENT DOCUMENTS

| 5,284,18 | 2/1994 | Kato et al. | 123/478 |
| 5,211,147 | 5/1993 | Ward | 123/418 |
| 5,215,061 | 6/1993 | Ogawa et al. | 123/478 |
| 5,226,393 | 7/1993 | Nagano et al. | 123/478 |
| 5,337,719 | 8/1994 | Togai | 123/478 |

FOREIGN PATENT DOCUMENTS

| 59-29733 | 2/1984 | Japan | 123/478 |
| 59-128930 | 7/1984 | Japan | 123/478 |
| 3-3941 | 1/1991 | Japan | 123/478 |

*Primary Examiner*—Raymond A. Nelli
*Attorney, Agent, or Firm*—Foley & Lardner

[57] ABSTRACT

The intake flow velocity near the jet of a fuel injection valve is obtained on the basis of the engine rotational speed, engine intake air quantity and intake valve opening area. A crank angle position for maximum intake flow velocity is set as the timing for completion of fuel injection by the fuel injection valve. As a result, fuel injection can be reliably completed at a timing giving good fuel atomization characteristics.

10 Claims, 8 Drawing Sheets

APPARATUS AND METHOD FOR FUEL INJECTION TIMING CONTROL OF AN INTERNAL COMBUSTION ENGINE

TECHNICAL FIELD

The present invention relates to an apparatus and method for injection timing control of an internal combustion engine, and in particular to an apparatus and method for controlling the fuel injection timing of a fuel injection valve such that fuel injection is completed at a predetermined injection end timing.

BACKGROUND ART

An internal combustion engine of this type is disclosed for example in Japanese unexamined Patent Publication No. 59-29733.

With this engine, the injection end timing for fuel injection using fuel injection valves for each cylinder is timed to occur just before the intake stroke for each cylinder. This is achieved by variably setting the injection start timing which is calculated backwards for a fuel injection quantity (fuel injection time) computed on the basis of the engine operating conditions. As a result, high combustion stability can be achieved.

Engine intake flow however is influenced by engine operating conditions prior to the intake stroke due to an intake filling effect caused by intake/exhaust valve overlap, and in the case of an engine with variable valve timing, there is also an influence due to valve timing variation.

Consequently, with an allocated injection end timing adapted for steady state conditions, control to give an optimum injection end timing under all operating conditions including transient operation is not possible, so that stable optimum combustion for all operating conditions cannot be attained.

It is an object of the present invention to address the above problem, and improve engine combustion by providing an apparatus and method of injection timing control whereby an optimum injection end timing for all operating conditions including transient operation can be set by detection of the intake flow velocity near the jet of the fuel injection valve.

It is also an object to be able to complete fuel injection at a crank angle position wherein the intake flow velocity near the jet of the fuel injection valve is at a maximum.

Furthermore, it is an object to be able to stably control injection end timing by limiting a variable range of the injection end timing.

Moreover, when a variable valve timing mechanism is provided, it is an object to be able to avoid influence from variations in valve timing on the accuracy of detecting the intake flow velocity near the jet.

It is an even further object to be able to accurately determine the intake flow velocity near the jet of the fuel injection valve.

DISCLOSURE OF THE INVENTION

The characteristics of the construction adopted in the present invention to solve the above problem involves a construction wherein the fuel injection valve is driven according to a fuel injection quantity calculated on the basis of the engine operating conditions, so that the fuel injection is completed at a predetermined injection end timing. With this construction, at least engine rotational speed, engine intake air quantity and intake valve opening area are each detected as parameters. The intake flow velocity near the jet of the fuel injection valve is then obtained on the basis of the detected parameters, and a predetermined injection end timing variably set according to the obtained intake flow velocity.

With such a construction, the injection end timing can be varied to correspond to variations in conditions of the intake flow velocity near the jet of the fuel injection valve.

Preferably the construction is such that a crank angle position wherein the intake flow velocity near the jet of the fuel injection valve is greater than a predetermined value, is set as the injection end timing.

In this case, even with a change in the crank angle position for a maximum intake flow velocity, the injection can be completed at a timing corresponding to this change so that the intake flow velocity is always a maximum.

Moreover, when the crank angle interval between the intake opening top dead center (TDC) and the intake closing bottom dead center (BDC) is 100%, then preferably the injection end timing is set to be within a crank angle range of ±40% from the central point of the crank angle interval.

It has been experimentally determined that desirable practically stable combustion conditions are obtained within the beforementioned crank angle range. Therefore, with the construction wherein the injection end timing is variably set on the basis of detection results of the intake flow velocity, the variable setting range for the injection end timing should be kept within this crank angle range.

Moreover, when the internal combustion engine incorporates a variable valve timing mechanism for varying the valve timing, then the construction may be such that the intake valve opening area is detected on the basis of crank angle position and timing control information of the variable valve timing mechanism.

With such a construction, an accurate opening area can be detected in spite of variations in opening timing of the intake valve produced by the variable valve timing mechanism.

Preferably the construction is such that the intake flow velocity near the jet of the fuel injection valve is determined using as parameters the intake flow velocity near the intake valve and the intake flow velocity at the location within the engine intake quantity is detected.

In this case, the intake flow velocity near the jet of the fuel injection valve can be accurately estimated from the upstream intake flow velocity at the engine intake quantity, and the downstream intake flow velocity near the intake valve.

BEST MODE FOR CARRYING OUT THE INVENTION

As follows is a description of the embodiments of the present invention.

Figure 2:
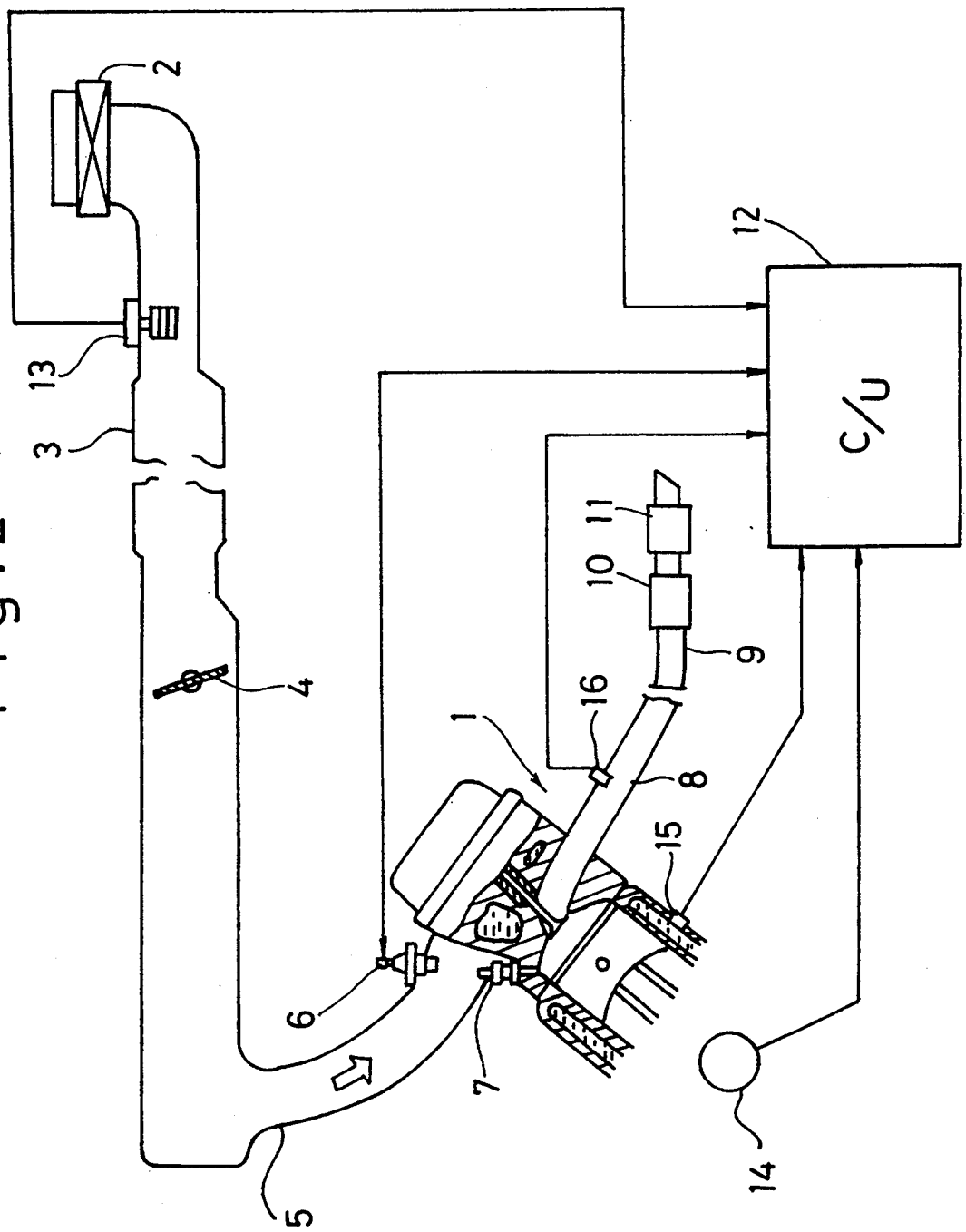
FIG. 2 is a schematic system diagram of an embodiment of the present invention.

In FIG. 2 showing an embodiment, air is drawn into an internal combustion engine 1 from an air cleaner 2, by way of an intake duct 3, a throttle valve 4, and an intake manifold 5.

Fuel injection valves 6 for each cylinder are provided in respective branch portions of the intake manifold 5. The fuel injection valves 6 are solenoid type injection valves which open with current to the solenoid and close with no current. When opened with current flow caused by an injection pulse signal from a control unit 12 to be described later, the fuel injection valves 6 inject/supply to the engine 1, fuel which is pumped by a fuel pump (not shown in the figure) and regulated to a predetermined pressure by means of a pressure regulator.

Spark plugs 7 are provided in the respective combustion chambers of the engine 1, for igniting the mixture. The exhaust gas from the engine 1, is discharged by way of an exhaust manifold 8, an exhaust duct 9, a catalytic converter 10, and a muffler 11.

The control unit 12 as a fuel supply control device (refer to FIG. 1) comprises a micro computer incorporating a CPU, ROM, RAM, A/D converter, and input-/output interface etc. The control unit 12 receives input signals from the respective sensors, and electronically controls the fuel supply to the engine by computing and setting the fuel injection quantity Ti to be injected by the fuel injection valves 6 (to be described later), and outputting to the fuel injection valves 6, at a predetermined injection timing, an injection pulse signal corresponding to this fuel injection quantity Ti.

An air flow meter 13, being one of the beforementioned various sensors, is provided in the intake duct 3, and outputs a signal corresponding to the intake air quantity Q of the engine 1.

Also provided is a crank angle sensor 14 which outputs a rotation signal for each predetermined crank angle. Here the engine rotational speed Ne is determined by measuring the period, or the number of occurrences of the rotation signal within a predetermined time.

A water temperature sensor 15 is provided for detecting the cooling water temperature Tw of the water jacket of the engine 1.

An oxygen sensor 16 is also provided for detecting the air fuel ratio of the engine intake mixture by sensing the oxygen concentration in the exhaust at the combined portion of the exhaust manifold 8.

The micro computer CPU inside the control unit 12 computes a basic fuel injection quantity Tp based on the intake air quantity Q and the engine rotational speed Ne, and computes a final fuel injection quantity Ti (injection pulse width) by correcting the basic fuel injection quantity Tp in accordance with engine operating conditions such as the cooling water temperature Tw.

Figure 9:
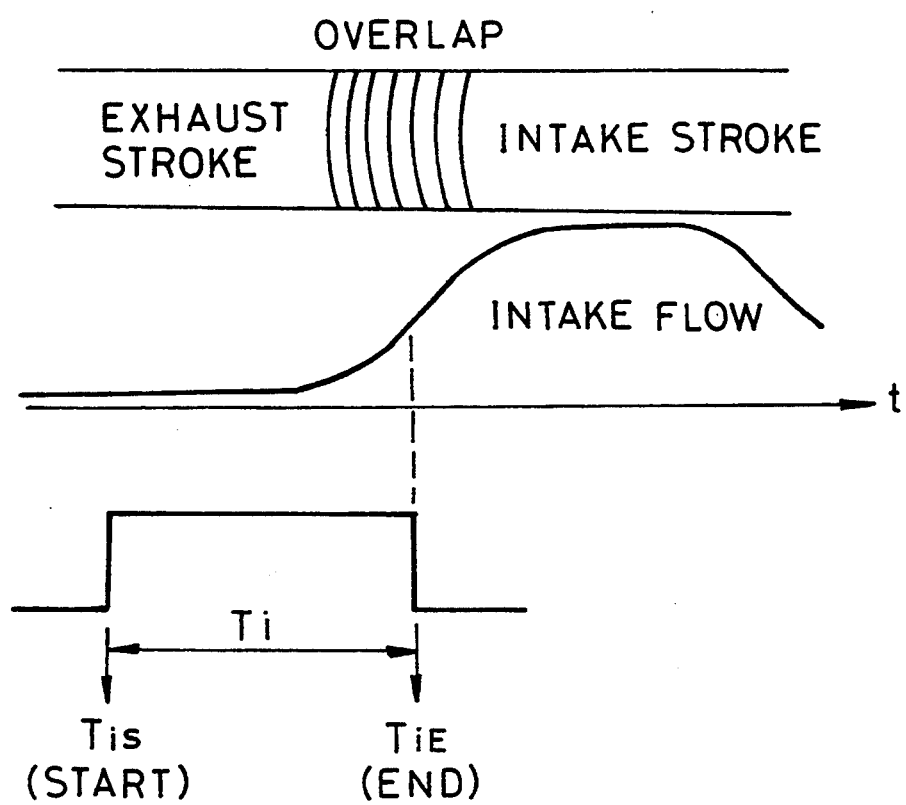
FIG. 9 is a time chart illustrating injection end timing control characteristics.

Subsequently, a fuel injection starting timing Tis is set on the basis of the fuel injection end timing TiE and a crank angle corresponding to the beforementioned fuel injection quantity Ti. When this fuel injection start timing Tis occurs, an injection pulse signal of a pulse width corresponding to the fuel injection quantity Ti is output to the fuel injection valve 6 (refer to FIG. 9).

As follows is a description, in accordance with the flow charts of FIG. 3 through FIG. 5 of an embodiment of the setting control of the injection end timing TiE and the injection timing control using the injection end timing TiE carried out by means of the control unit 12. The description of the embodiment shall be given on condition that a variable valve timing mechanism is provided.

Figure 3:
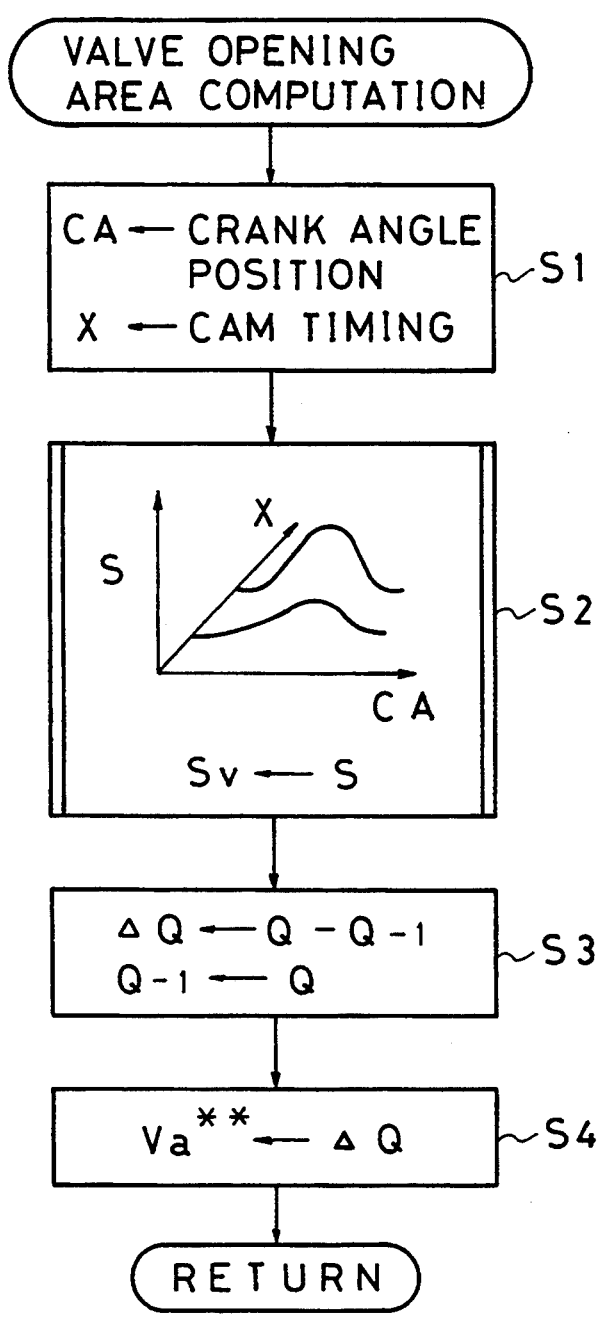
FIG. 3 is a flow chart for obtaining various parameters.

The program illustrated by the flow chart of FIG. 3 is for obtaining the intake valve opening area, and calculating the intake air flow velocity Va **(the intake flow velocity near the air flow meter 13) from the data of the intake air quantity Q.

In the flow chart of FIG. 3, initially in step 1 (indicated by S1 in the figure with subsequent steps indicated by S) the data for the actual crank angle position obtained on the basis of the crank angle sensor 14 detection signal, is set to "CA", and the information indicating the actual cam timing (timing control information) is set to "X".

In step 2, the actual intake valve opening area S is obtained by referring to the pre-stored map of intake valve opening area S versus crank angle position CA and cam timing information X, and is set to "Sv". When a variable valve timing mechanism is not provided, the actual intake valve opening area S may be obtained on the basis of information on the crank angle position CA only.

Accordingly, in the present embodiment, the actual intake valve opening area S is detected on the basis of the crank angle position CA and the cam timing information X.

In step 3, the change rate ΔQ of the intake air quantity Q is calculated as the difference between the data for the most recent intake air quantity Q detected by the air flow meter 13, and the previous detected value Q-1 (a detected before predetermined time). The most recently detected air quantity Q is then set as the previous value Q-1 to calculate the DQ in the next execution.

Figure 7:
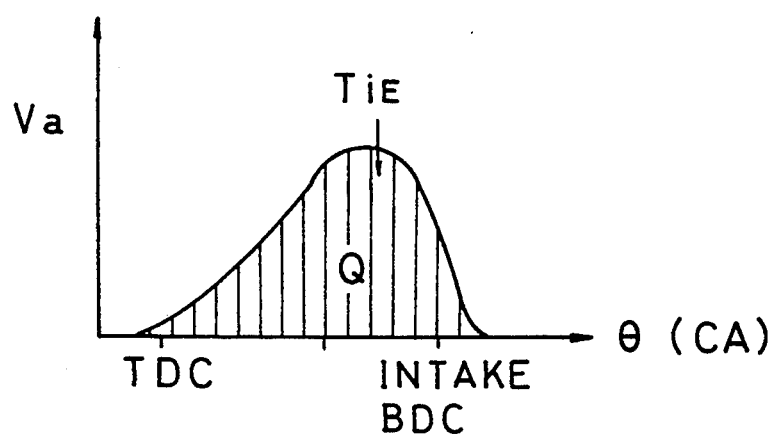
FIG. 7 is a diagram illustrating a relationship between intake air quantity and intake flow velocity.

In step 4, the change rate ΔQ of the beforementioned air quantity is set to the intake air flow velocity Va. That is to say, the intake air quantity Q correlates with the intake flow velocity Va (refer to FIG. 7), and for a crank angle of q, the intake air quantity Q can be expressed by the equation $Q = k \int Va^{} d\theta$ (where k is a constant), giving $Va^{} = 1/k\, \Delta Q$. Hence, in the present embodiment ΔQ can be considered equal to Va(ΔQ=Va**).

Figure 4:
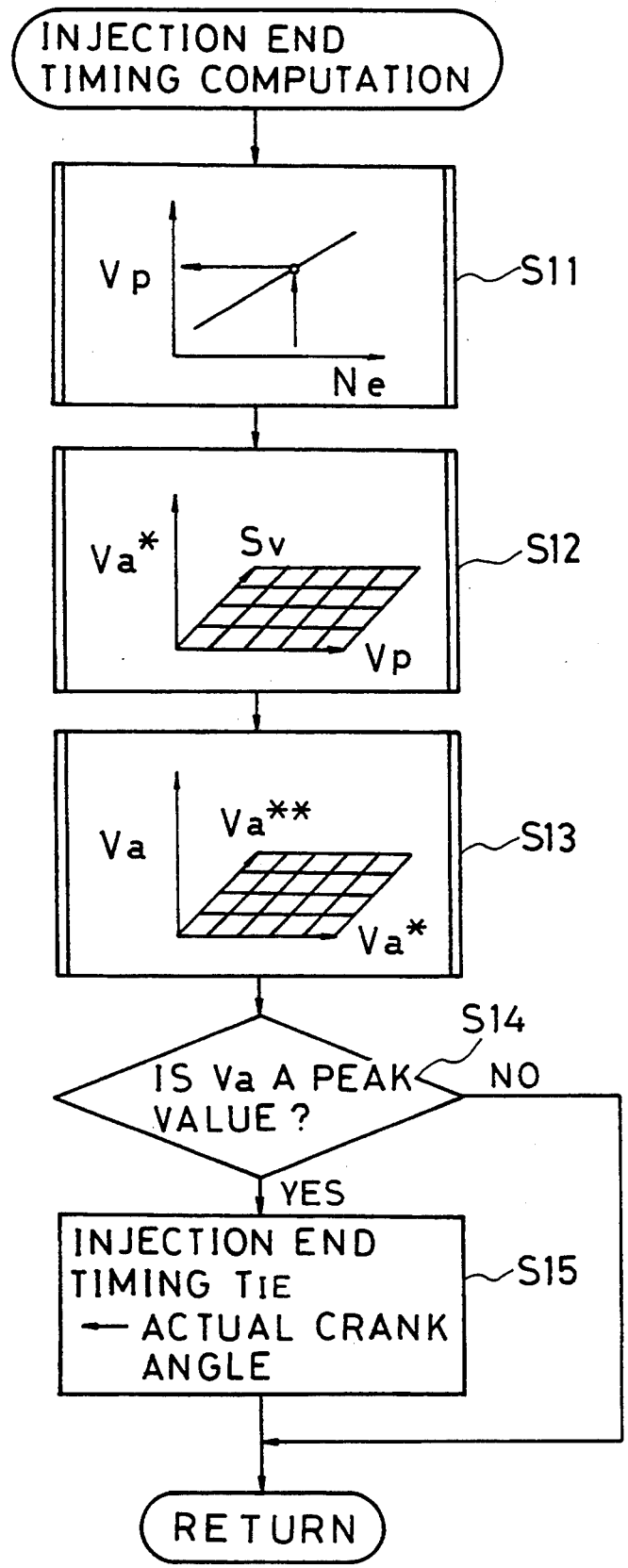
FIG. 4 is a flow chart showing a control for setting injection end timing.

The program illustrated by the flow chart of FIG. 4 is for variably setting the injection end timing TiE using the data of the beforementioned intake air flow velocity Va**.

The function of the software of the control unit 12 shown in the flow chart of FIG. 4 corresponds to the intake flow velocity determining device and the injection end timing varying device (refer to FIG. 1) of the present embodiment.

Initially, in step 11, the piston velocity Vp corresponding to the actual engine rotational speed Ne is obtained using the table for converting engine rotational speed Ne into piston velocity Vp.

Figure 6:
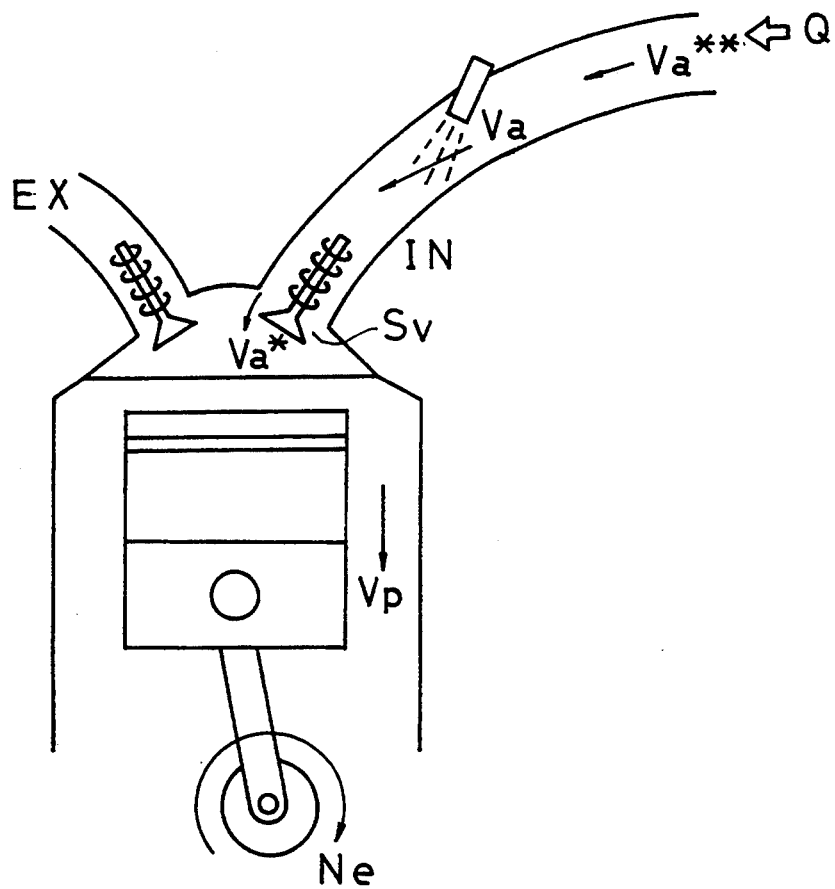
FIG. 6 is a diagram showing the respective parameters used in the embodiments.

In step 12, a pre-stored map of intake velocity Va* near the intake valve (see FIG. 6) in relation to the valve opening area Sv and the piston velocity Vp is referred to, and the intake velocity Va* near the intake valve (a parameter corresponding to the negative intake pressure occurring near the intake valve) in relation to the actual valve opening area Sv and the piston velocity Vp obtained.

In step 13, the stored map of intake velocity Va near the jet of the fuel injection valve 6 in relation to the intake velocity Va* near the intake valve, and the intake air flow velocity Va** (intake flow velocity near the air flow meter 13) obtained from the flow chart of FIG. 3 is referred to, and the actual intake velocity Va near the jet obtained.

In step 14, it is judged if the intake velocity Va near the jet obtained for this time is a peak value (maximum value). If a peak value, control proceeds to step 15, and the actual crank angle position is set to the injection end timing TiE. The parts of step 14 and 15 correspond to the injection end timing varying device (refer to FIG. 1).

That is to say, the intake velocity Va near the jet of the fuel injection valve 6 is estimated using the valve opening area obtained from the crank angle position and information on cam timing, the piston velocity Vp obtained from the engine rotational speed Ne, and the change rate ΔQ of the intake air quantity Q (intake air flow velocity Va**). The timing when this intake velocity Va is a peak value is then made the injection end timing TiE.

The intake flow velocity parameter detection device according to the present embodiment (refer to FIG. 1) corresponds as mentioned before, to the crank angle sensor 14, the air flow meter 13, and the information on opening area in relation to crank angle positions stored in the control unit 12.

By making the injection end timing TiE the crank angle position for maximum intake velocity Va near the jet, the fuel spray can be subjected to a faster intake flow as it is drawn into the cylinder, thus ensuring good atomization.

Moreover, the crank angle position for a maximum intake velocity Va, is calculated as data corresponding to the engine operating conditions based on the valve opening area, the piston velocity Vp (engine rotational speed Ne) and the intake air flow velocity Va** (change rate ΔQ of the intake air quantity Q). Consequently, even with transient operation of the engine or change in the cam timing, a position so that the intake velocity Va near the jet is stably at a maximum can be set to the injection end timing TiE. Thus high atomization can be realized for all driving conditions (including transient conditions).

Figure 8:
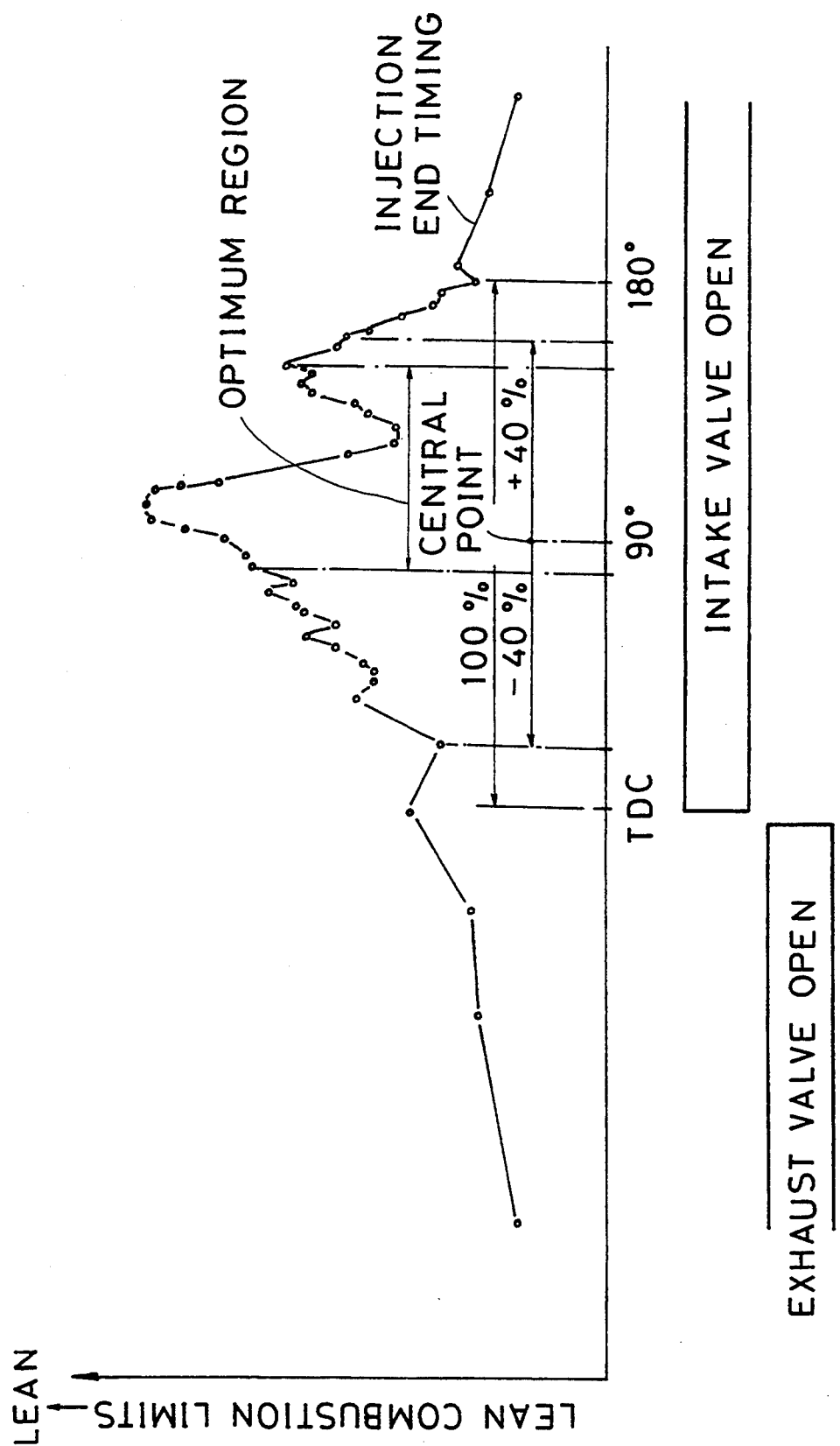
FIG. 8 is a diagram illustrating the characteristics of lean combustion limits in relation to injection end timing.

FIG. 8 shows, as a change in lean combustion limits, changes in combustion characteristics with change in injection end timing TiE. This shows that combustion at higher air fuel ratios is possible with higher lean combustion limits.

As shown in FIG. 8, when the crank angle interval between the intake opening TDC and the intake closing BDC is 100%, then if the injection end timing TiE is set to be within a crank angle range of ±40% from the central point of the crank angle interval, it is experimentally determined that comparatively good combustion characteristic are obtained.

Accordingly, it is not always necessary for the injection end timing to be at the time of maximum intake velocity Va near the jet. However the injection end timing TiE should preferably be variably set within the crank angle range wherein good combustibility is obtained.

In the above embodiments, the intake velocity Va near the jet was obtained using a plurality of maps. However the intake velocity Va near the jet may be obtained by setting a model equation of the engine intake flow and applying the various data to this equation.

Figure 5:
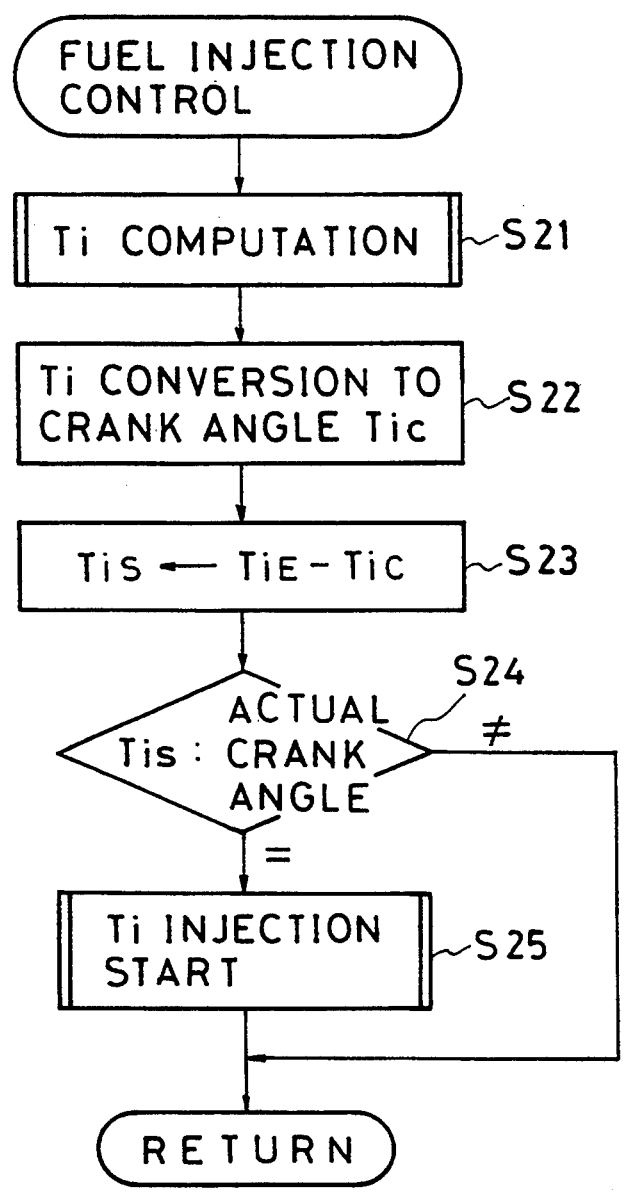
FIG. 5 is a flow chart showing a control for fuel injection based on injection end timing.

The injection end timing TiE set as described above is used in the fuel injection control illustrated in the flow chart of FIG. 5.

Figure 1:
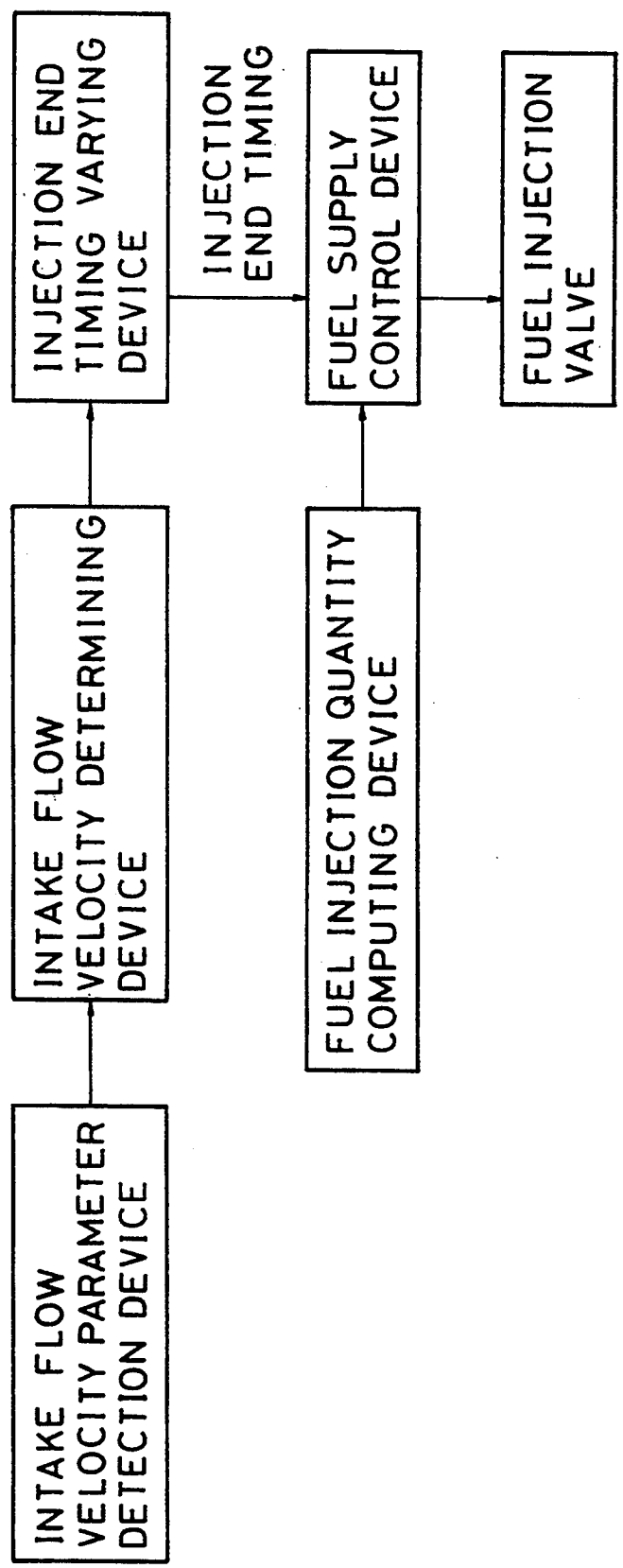
FIG. 1 is a block diagram showing a basic construction according to the present invention.

The software function of the control unit 12 illustrated in the flow chart of FIG. 5 corresponds to the fuel injection quantity computing device and fuel supply control device of the present embodiment (see FIG. 1).

In the flow chart of FIG. 5, initially in step 21, a fuel injection quantity Ti (injection pulse width) is computed on the basis of the engine operating conditions.

Then in step 22, the fuel injection quantity Ti is converted into a crank angle Tic based on the engine rotational speed Ne.

In step 23, an injection start timing Tis (injection start crank angle position) to ensure completion of fuel injection at the injection end timing TiE, is set based on the injection end timing TiE and the crank angle Tic.

In step 24, the actual crank angle and the injection start timing Tis are compared. When the actual crank angle is equal to injection start timing Tis, control proceeds to step 25, and an injection pulse signal of a pulse width corresponding to the fuel injection quantity Ti is output to the fuel injection valve 6 of the corresponding cylinder, to inject fuel to each of the respective cylinders.

INDUSTRIAL APPLICABILITY

With the above apparatus and method for the fuel injection timing control of an internal combustion engine according to the present invention, good combustion atomization can be stably obtained, thereby improving combustion performance. In particular, when applied to an automotive internal combustion engine, an improvement in exhaust conditions is possible.

We claim:

1. An internal combustion engine fuel injection timing control apparatus characterized in comprising:

fuel injection quantity computing means for computing a fuel injection quantity on the basis of the engine operating conditions;

fuel supply control means for drive control of a fuel injection valve according to said fuel injection quantity so as to complete fuel injection at a predetermined injection end timing;

intake flow velocity parameter detection means for detecting as parameters correlating with intake flow velocity, at least engine rotational speed, engine intake air quantity, and intake valve opening area;

intake flow velocity determining means for obtaining an intake flow velocity near a jet of said fuel injection valve on the basis of said parameters detected by said intake flow velocity parameter detection means; and injection end timing varying means for variably setting a predetermined injection end timing in said fuel supply control means on the basis of the intake flow velocity obtained by said intake flow velocity determining means.

2. An internal combustion engine fuel injection timing control apparatus as claimed in claim 1, characterized in that said injection end timing varying means sets as the injection end timing, a crank angle position wherein the intake flow velocity near the jet of the fuel injection valve is greater than a predetermined value.

3. An internal combustion engine fuel injection timing control apparatus as claimed in claim 1, characterized in that said injection end timing varying means sets the injection end timing to be within a crank angle range of ±40% from a central point of a crank angle interval, when the crank angle interval between the intake opening top dead center and the intake closing bottom dead center is 100%.

4. An internal combustion engine fuel injection timing control apparatus as claimed in claim 1, characterized in that the internal combustion engine incorporates a variable valve timing mechanism for varying the valve timing, and said intake flow velocity parameter detection means detects the intake valve opening area on the basis of crank angle position and timing control information of said variable valve timing mechanism.

5. An internal combustion engine fuel injection timing control apparatus as claimed in claim 1, characterized in that said intake flow velocity determining means determines the intake flow velocity near the jet of the fuel injection valve using as parameters intake velocity near the intake valve and intake flow velocity wherein an engine intake quantity is detected.

6. An internal combustion engine fuel injection timing control method characterized in comprising the steps of:
  computing a fuel injection quantity on the basis of the engine operating conditions;
  drive controlling a fuel injection valve according to said fuel injection quantity so as to complete fuel injection at a predetermined injection end timing;
  detecting as parameters correlating with intake flow velocity, at least engine rotational speed, engine intake air quantity, and intake valve opening area; obtaining an intake flow velocity near a jet of said fuel injection valve on the basis of said parameters; and
  variably setting a predetermined injection end timing on the basis of said intake flow velocity.

7. An internal combustion engine fuel injection timing control method as claimed in claim 6, characterized in that said step of variably setting the injection end timing sets as the injection end timing, a crank angle position wherein the intake flow velocity near the jet of the fuel injection valve is greater than a predetermined value.

8. An internal combustion engine fuel injection timing control method as claimed in claim 6, characterized in that said step of variably setting the injection end timing sets the injection end timing to be within a crank angle range of ±40% from a central point of a crank angle interval, when the crank angle interval between the intake opening top dead center and the intake closing bottom dead center is 100%.

9. An internal combustion engine fuel injection timing control method as claimed in claim 6, characterized in that the internal combustion engine incorporates a variable valve timing mechanism for varying the valve timing, and said step of detecting parameters correlating with intake flow velocity, detects the intake valve opening area on the basis of crank angle position and timing control information of said variable valve timing mechanism.

10. An internal combustion engine fuel injection timing control method as claimed in claim 6, characterized in that said step of obtaining the intake flow velocity determines the intake flow velocity near the jet of the fuel injection valve using as parameters intake flow velocity near the intake valve and intake flow velocity at a location of wherein an engine intake quantity is detected.

* * * * *